United States Patent
Alm

[11] 3,939,383
[45] Feb. 17, 1976

[54] LIQUID LEVEL MONITORING DEVICE

[75] Inventor: Gerald F. Alm, Grangeville, Idaho

[73] Assignee: The Wickes Corporation, San Diego, Calif.

[22] Filed: Jan. 31, 1975

[21] Appl. No.: 546,010

[52] U.S. Cl. ............... 317/123; 73/49.2; 200/83 R; 317/DIG. 3; 340/242
[51] Int. Cl.² ........................................ H01H 47/00
[58] Field of Search... 317/DIG.3; 200/61.04, 61.25, 200/83 A, 83 S, 83 SA, 83 W; 340/242, 244; 73/40, 49.2, 290, 299, 303

[56] References Cited
UNITED STATES PATENTS

| | | | |
|---|---|---|---|
| 3,218,856 | 11/1965 | Bossard | 73/40 |
| 3,460,386 | 8/1969 | Guignard | 73/299 |
| 3,538,746 | 11/1970 | Jacobs et al. | 73/49.2 |

Primary Examiner—J. D. Miller
Assistant Examiner—Harry E. Moose, Jr.
Attorney, Agent, or Firm—Learman & McCulloch

[57] ABSTRACT

A liquid level monitoring device operable either to detect leakage from a body of liquid or to detect deviations from a controlled rate of withdrawal from a body of liquid. The device employs a pressure responsive diaphragm which, in the face of unequalized pressures applied to its opposite sides, is operable to actuate a control switch. One side of the diaphragm is exposed to a constant pressure, which may be atmospheric, while the other side of the diaphragm is connected to an open ended probe submerged in the body of liquid. When employed as a leak detector, the device is set by opening a solenoid controlled valve connected across a diaphragm to equalize pressure at opposite sides of the diaphragm while the probe is submerged in the body of liquid. Subsequent dropping of the level in the body of liquid after closure of the valve will reduce the head pressure sensed by the probe, thus unequalizing the pressure across the diaphragm to actuate the control switch which may, for example, be connected to trigger an alarm. A second by-pass connected across opposite sides of the diaphragm in parallel with the first by-pass includes a variable restricted orifice which provides a sensitivity adjustment in the leak detecting operation. By opening the orifice in the second by-pass to a selected opening, the device may be employed to monitor dropping of the liquid level at a selected rate.

9 Claims, 2 Drawing Figures

LIQUID LEVEL MONITORING DEVICE

SUMMARY OF THE INVENTION

The present invention is especially designed so that it is equally capable, with a single simple adjustment, to function as a leak detector or to alternatively monitor a controlled rate of withdrawal of liquid from a storage tank or reservoir. An open ended pressure sensing probe is submerged within a body of liquid and connected to a chamber having one side defined by a flexible diaphragm. Upon a dropping of the liquid level of the body of liquid in which the probe is submerged, a corresponding drop in pressure in the diaphragm chamber will occur, thus causing the diaphragm to flex. The opposite side of the diaphragm is exposed to a constant pressure, which most conveniently can be atmospheric pressure. A first by-pass conduit is connected from the probe side of the diaphragm to the constant pressure side and includes a solenoid controlled valve normally closed during operation of the device. Opening of the solenoid valve after the probe has been submerged into the body of liquid equalizes the pressure on the probe and constant pressure sides of the diaphragm, and in this condition a control switch operated by flexure of the diaphragm is in a normal closed position. A second by-pass conduit is connected between the probe and constant pressure side of the diaphragm and has a variable restricted orifice. When the solenoid valve in the first by-pass is closed, the orifice may, in a leak detection operation, also be closed or, if desired, opened slightly to reduce the sensitivity of the system. A reduction in sensitivity is sometimes desirable where evaporation losses or other relatively long-term normal decreases in the liquid level may be encountered. Where liquid is to be withdrawn at a monitored constant rate, the orifice may be opened to a point where it provides a rate of pressure equalization across the diaphragm corresponding to the rate of withdrawal of liquid from the system.

Because the device is initially set by equalizing pressure across the diaphragm and detecting a change from this equalization, rather than measuring a specific magnitude of pressure, the device can readily be reset at any given level of liquid or depth of submergence of the probe. A mercury valve is in the embodiment to be described, connected from the probe to the constant pressure side of the diaphragm to provide a cushioning effect in the face of a massive drop of liquid level over a short period of time by acting as a double-acting check valve.

Other objects and features of the invention will become apparent by reference to the following specification and to the drawings.

IN THE DRAWINGS

Figure 1:
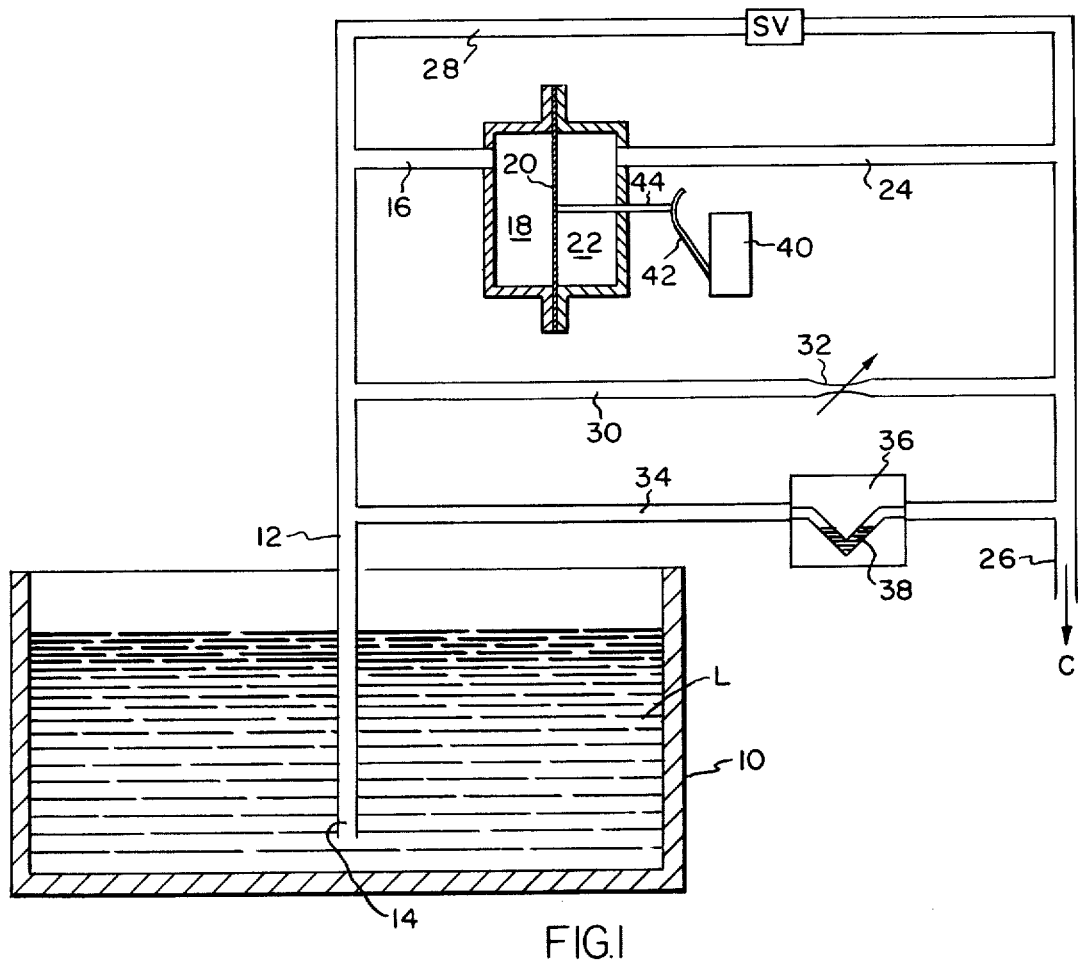
FIG. 1 is a schematic diagram of a system embodying the present invention.

Referring first to FIG. 1, a system embodying the present invention is employed in a leak detecting operation to detect leaking of liquid from a schematically illustrated storage tank 10. The apparatus includes a probe conduit 12 open at its lower end 14, the lower end 14 being submerged in the body of liquid L contained in tank 10. Probe conduit 12 is connected by a branch conduit 16 to a chamber 18 having one side defined by a flexible impervious diaphragm 20. A chamber 22 at the opposite side of diaphragm 20 is connected by a branch line 24 to a control conduit 26 which may be connected to a source of constant pressure schematically indicated at C. Normally conduit 26 is simply vented to atmosphere. A first by-pass conduit 28 is connected across diaphragm 20 between probe conduit 12 and control conduit 26. A normally closed solenoid actuated valve SV is connected in by-pass conduit 28.

A second by-pass conduit 30 is likewise connected across diaphragm 20 between probe conduit 12 and control conduit 26. A variable restriction, schematically illustrated at 32, is located in conduit 30.

A third by-pass conduit 34 is connected between probe conduit 12 and control conduit 26 and includes a mercury valve 36 having a trapped pool of mercury 38 in a V-shaped passage within valve 36.

A control switch 40 is fixedly mounted adjacent the diaphragm with its actuating leaf 42 in contact with an actuating rod 44 fixedly secured to diaphragm 20 and slidably passing through the outer casing of chamber 22. As will be developed in further detail below in connection with the description of the electrical circuit, switch 40 is normally closed when diaphragm 20 senses equalized pressures in chambers 18 and 22 and is opened upon deflection of diaphragm 20 to the left as viewed in FIG. 1 upon a reduction of pressure in chamber 18 to a pressure less than that in chamber 22.

Figure 2:
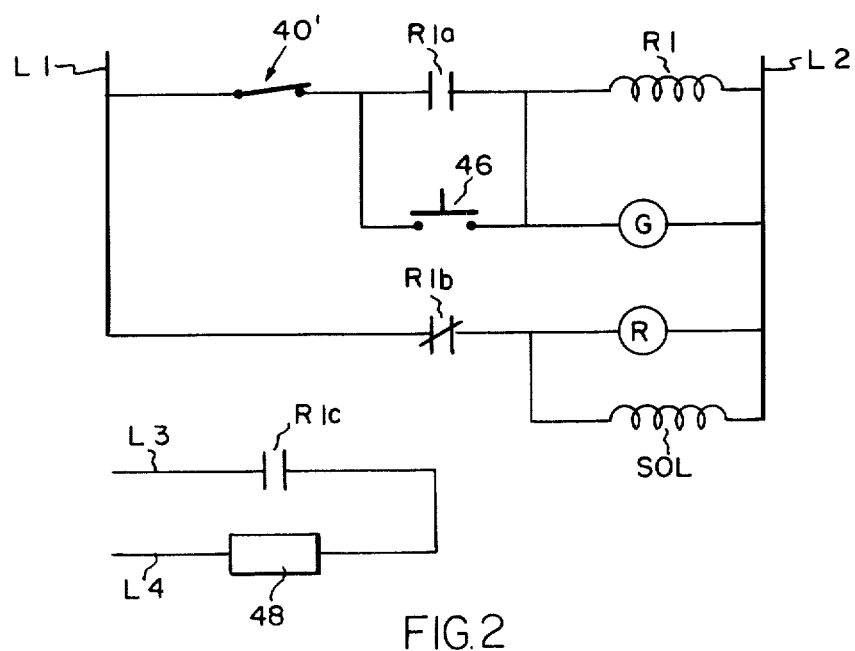
FIG. 2 is a schematic diagram of the electrical circuit employed with the system of FIG. 1.

Referring now to FIG. 2, a control relay R-1 is connected across electrical supply lines L-1 and L-2 via normal open contacts R-1a and the normally closed contacts 40' of switch 40. Manually actuated reset contacts 46 are connected in parallel with contacts R-1a, contacts R-1a functioning as lock-in contacts to maintain relay R-1 energized upon a momentary depression of reset contacts 46, assuming that contacts 40' are closed at that time. Relay R-1 is normally energized during operation of the device and a green indicator light G may be connected in parallel with relay R-1 to indicate a no-leak, normal operation condition of the device.

The control solenoid SOL of solenoid operated valve SV is connected across supply lines L-1 and L-2 via normal closed contacts R-1b which are operated by relay R-1. When relay R-1 is energized, contacts R-1b are open, solenoid SOL is deenergized and solenoid valve SV is closed.

Relay R-1 is also disclosed as controlling a third set of contacts R-1c, connected to control a secondary circuit including electric supply lines L-3 and L-4 and a device 48 which may take the form of an audible alarm, a shut-off valve or some other device whose operation is desired upon the detection of a leak by the system.

Operation of the system is as follows. With the various contacts of the electrical circuits in their respective normal conditions as illustrated in FIG. 2, the lower end 14 of probe conduit 12 is submerged into the body of liquid L to be monitored. The depth of submergence of the lower end of probe conduit 12 is not critical. With the various switch contacts in their illustrated normal condition, solenoid SOL of solenoid valve SV is energized via normal closed contacts R-1b and solenoid valve SV is open so that pressure is equalized on opposite sides of diaphragm 20 in chambers 18 and 22.

To condition the device for operation, reset switch contacts 46 are manually closed momentarily, thereby energizing relay R-1, via contacts 40', closed when pressure across diaphragm 20 is equalized. As soon as relay R-1 is energized by the closure of reset contacts 46, the relay is locked in by the closure of its normally open contacts R-1a and will remain energized on subsequent opening of contacts 46.

Relay R-1 simultaneously, upon energization, opens normal closed contacts R-1b to deenergize solenoid SOL, thus closing valve SV to isolate chambers 18 and 22 from each other.

In a simple leak detecting operation, variable restriction 32 usually will be closed, and thus if the level of liquid L in tank 10 drops, due to leakage, a corresponding reduction in head pressure is sensed at the open end 14 of probe conduit 12 and the reduced pressure is thus applied to chamber 18 to permit diaphragm 20 to flex to the left, as viewed in FIG. 1, as the pressure in chamber 18 drops below the constant pressure applied to chamber 20 via branch conduit 24 and control conduit 26. Movement of diaphragm 20 to the left retracts actuating rod 44 which in turn causes contacts 40' of switch 40 to open, thus deenergizing relay R-1.

Upon deenergization of relay R-1, contacts R-1b again close to energize solenoid SOL, thereby opening valve SV to again equalize pressure across the diaphragm. An indicator light R connected in parallel with solenoid SOL becomes energized and, if desired, the device 48 of the auxiliary circuit is simultaneously energized by the closure of normal closed contacts R-1c.

Assuming that the leak is repaired, to recondition the system for operation at the new liquid level, or any level reflecting the addition of make-up liquid to the tank 10, it is only necessary to again press reset button 46 to deenergize solenoid SOL and to energize relay R-1.

The system may be set to similarly monitor and control a constant rate of withdrawal of liquid L from tank 10 by adjustment of the variable restriction 32 in branch conduit 30. When restriction 32 is open, chambers 18 and 22 are placed in communication with each other via conduit 30 and the now open orifice in variable restriction 32. By setting restriction 32 to bleed pressure from control conduit 26 to probe conduit 12 via restriction 32 at rate equal to the constantly decreasing pressure in probe conduit 12 occasioned by the steadily dropping level of liquid L, the pressure across diaphragm 20 may be maintained equalized as long as the desired constant rate of withdrawal of liquid is not exceeded.

Mercury valve 36 functions to cushion sudden surges of pressure on either side of the system by absorbing the suddenly applied pressure in movement of the mercury pool. Where a highly sensitive diaphragm 20 is employed, the possibility of damage to the diaphragm in the event of a sudden massive leakage of liquid is minimized.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. A liquid level monitoring device comprising flexible pressure responsive diaphragm means, first pressure applying means for applying to one side of said diaphragm means a pressure variable in response to variations of level of a body of liquid being monitored, second pressure applying means for applying a constant pressure to the opposite side of said diaphragm means, first normally closed by-pass valve means operable in an open position to equalize the pressure on the opposite sides of said diaphragm means, second by-pass means connected in parallel with said first by-pass means establishing communication between opposite sides of said diaphragm means, sensitivity adjustment means in said second by-pass means for selectively blocking or adjustably restricting flow through said second by-pass means, and control means responsive to an unequalized pressure on opposite sides of said diaphragm means for opening said first by-pass valve means.

2. The invention defined in claim 1 wherein said control means comprises an electrical power source, an electrically operable control device, and electrical switch means connected in circuit with said power source and said control device operable by flexure of said diaphragm means to selectively energize or deenergize said control device power source.

3. The invention defined in claim 1 wherein said first valve means comprises a solenoid controlled valve open when deenergized and closed when energized, an electrical power source for energizing said solenoid controlled valve, and electrical control circuit means connected to said source and said solenoid controlled valve operable in a first condition to energize said solenoid controlled valve and operable in a second condition to deenergize said solenoid controlled valve.

4. The invention defined in claim 3 wherein said circuit means comprises first switch means operable by said diaphragm means for shifting said circuit means from said second condition to said first condition in response to the application of unequal pressures to opposite sides of said diaphragm means.

5. The invention defined in claim 4 further comprising an electrical relay connected in series with said first switch means, and a set of normal closed contacts controlled by said relay connected in said circuit means to establish said first condition when said relay is energized and to establish said second condition when said relay is deenergized.

6. The invention defined in claim 5 further comprising manually operable reset means in said circuit means for shifting said circuit means from said first condition to said second condition.

7. A liquid level monitoring device comprising differential pressure responsive means, first pressure applying means for applying to one side of said pressure responsive means a first pressure variable in accordance with variations of the level of a body of liquid being monitored, second pressure responsive means for applying a constant pressure to the opposite side of said pressure responsive means, by-pass conduit means bypassing said pressure responsive means operable in a first condition to connect said first and said second pressure applying means to each other to equalize the opposing pressures applied to said pressure responsive means and operable in a second condition to selectively isolate said first and second pressure responsive means from each other or to place said first and second pressure responsive means in communication with each other via variably restricted orifice means, and control means responsive to the sensing of a differential pressure by said pressure responsive means for establishing said by-pass means in said first condition.

8. The invention defined in claim 7 further comprising reset means in said control means operable to set said by-pass means in said second condition upon equalization of pressure in said first and said second pressure applying means.

9. A liquid level monitoring device comprising differential pressure responsive means, first pressure applying means for applying to one side of said pressure responsive means a first pressure variable in accordance with variations of the level of a body of liquid being monitored, second pressure responsive means for applying a constant pressure to the opposite side of said pressure responsive means, by-pass conduit means by-passing said pressure responsive means operable in a first condition to connect said first and said second pressure applying means to each other to equalize the opposing pressures applied to said pressure responsive means and operable in a second condition to isolate said first and second pressure responsive means from each other, control means responsive to the sensing of a differential pressure by said pressure responsive means for establishing said by-pass means in said first condition, and reset means in said control means operable to establish said by-pass means in said second condition when said pressure responsive means senses equalized pressures.

* * * * *